INVENTOR
GUNDER W. NYBERG

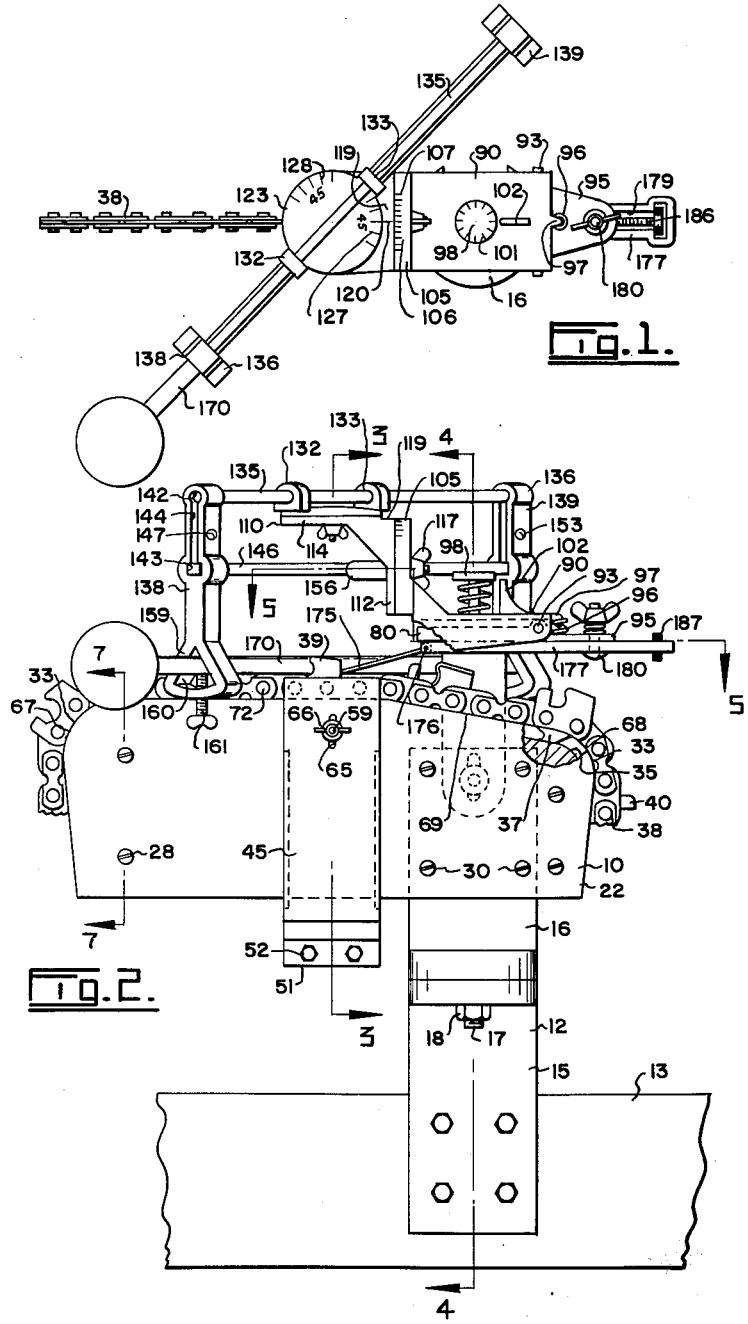
May 14, 1963  G. W. NYBERG  3,089,351
SAW CHAIN HOLDING AND FILING APPARATUS
Filed Dec. 27, 1960  3 Sheets-Sheet 1
INVENTOR
GUNDER W. NYBERG May 14, 1963 G. W. NYBERG 3,089,351
SAW CHAIN HOLDING AND FILING APPARATUS
Filed Dec. 27, 1960 3 Sheets-Sheet 2
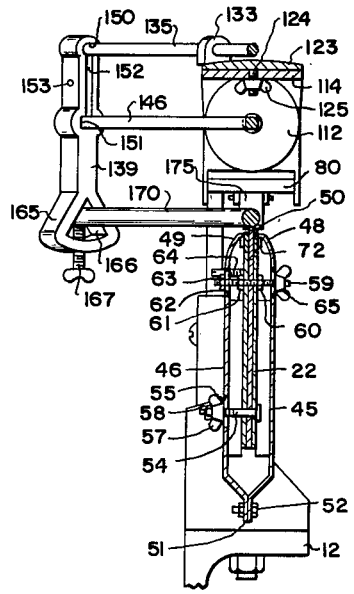
Fig. 3.
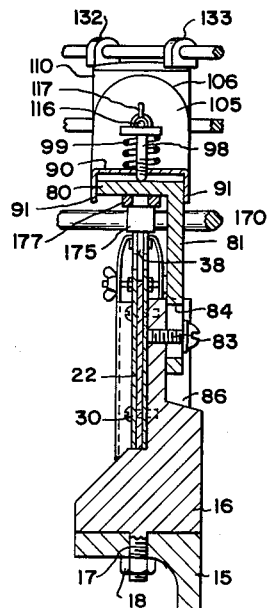
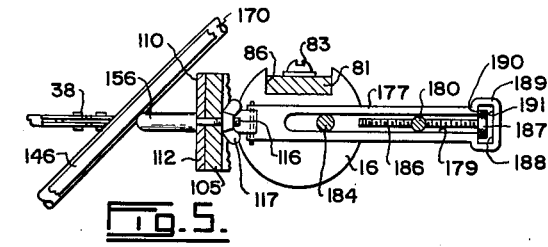
Fig. 5.  Fig. 4.
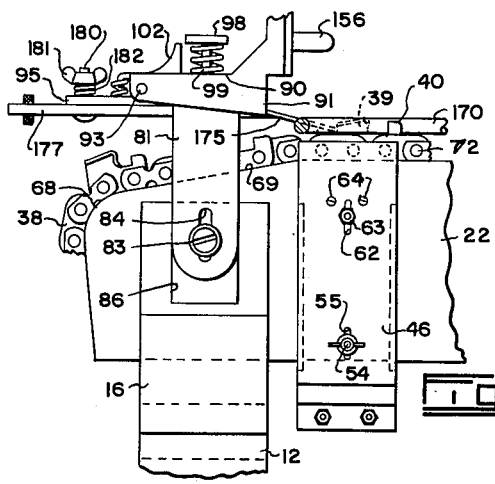
Fig. 6.
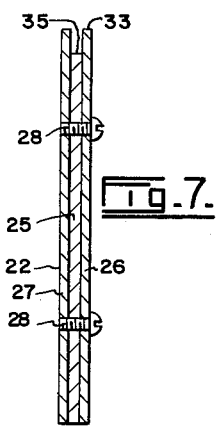
Fig. 7.
INVENTOR
GUNDER W. NYBERG

United States Patent Office 3,089,351
Patented May 14, 1963

3,089,351
SAW CHAIN HOLDING AND FILING APPARATUS
Gunder W. Nyberg, 6347 Parkcrest Drive,
North Burnaby, British Columbia, Canada
Filed Dec. 27, 1960, Ser. No. 78,629
6 Claims. (Cl. 76—36)

This invention relates to apparatus for holding and filing saw chains to sharpen and joint said chains.

An object of the present invention is the provision of apparatus for holding and filing saw chains without the necessity of taking the chains apart.

Another object is the provision of saw chain holding and filing apparatus which may be quickly and easily opened up to permit chains to be inserted therein and removed therefrom.

Another object is the provision of saw chain holding apparatus which may be easily adjusted to accommodate chains of different sizes and types.

A further object is the provision of apparatus of the nature described utilizing power means for quickly and accurately filing the cutter teeth in saw chains.

Saw chain holding and filing apparatus according to the present invention comprises a base plate having a supporting edge, a groove in and extending longitudinally of the supporting edge in which lugs of a saw chain extending along said edge may move with cutting teeth and depth gauges of said chain projecting away from the edge in the plane of the plate, a mounting support connected to the base plate for carrying the apparatus when in use, a pair of jaws carried by the base plate and extending towards each other over the supporting edge, said jaws being relatively movable to increase and decrease the size of a gap therebetween, means connected to at least one of the jaws for moving said jaw towards and away from the other jaw to grip and release a chain on the supporting edge and extending through the jaw gap, a base over and spaced from the supporting edge, supporting means secured to the base plate and the base for holding the latter in place over the supporting edge, said base being spaced from the supporting edge sufficiently to permit a chain on said edge to move therebetween, a frame swingably and slidably mounted on the base extending towards the base plate and across the plane of the latter, and clamping means on the frame adapted to grip a file to hold it across the base plate plane and a saw chain on the supporting edge thereof.

Preferred forms of the invention are illustrated in the accompanying drawings, in which:

FIGURE 1 is a plan view of the holding and filing apparatus,

FIGURE 2 is a side elevation of the apparatus,

FIGURE 3 is a vertical section taken on the line 3—3 of FIGURE 2,

FIGURE 4 is a vertical section taken on the line 4—4 of FIGURE 2,

Figure 8:
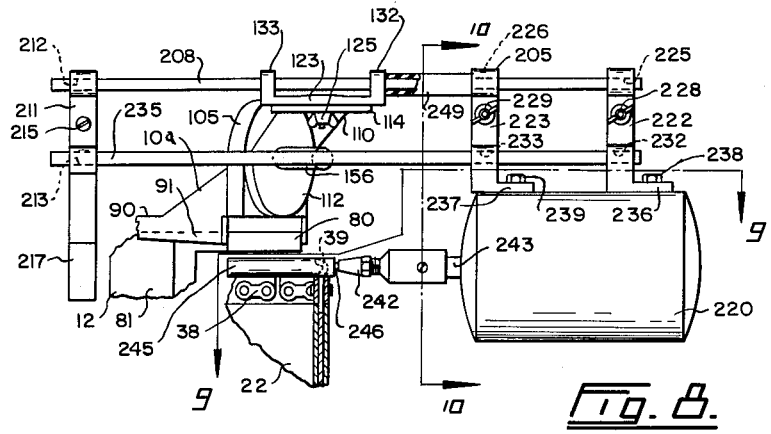
Figure 9:
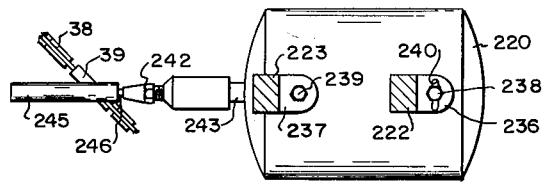
Figure 10:
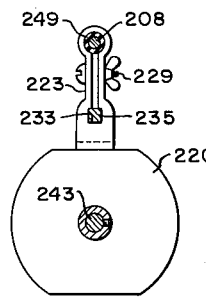

FIGURE 5 is a horizontal section taken substantially on the line 5—5 of FIGURE 2, FIGURE 6 is a fragmentary elevation of the side of the apparatus opposite that shown in FIGURE 2, FIGURE 7 is an enlarged vertical section taken on the line 7—7 of FIGURE 2, FIGURE 8 is an elevation of an alternative form of the holding and filing apparatus in operating position, FIGURE 9 is a horizontal section taken on the line 9—9 of FIGURE 8, and FIGURE 10 is a vertical section taken on the line 10—10 of FIGURE 8.

Referring to the drawings, 10 is a saw chain holding and filing apparatus including a support 12 which may be mounted on any suitable stand, such as part 13 of a work bench. The apparatus is preferably mounted in a vertical position, and it is so described herein, but it may be mounted in other positions, such as horizontally. Support 12 is preferably made in a lower section 15 and an upper section 16, the latter section being rotatably connected on a vertical axis to the lower section in any convenient manner, such as by a vertical bolt 17 and nut 18. A base plate 22 is mounted on the upper section 16 of support 12 in any convenient manner. This base plate is preferably located in a vertical plane, as shown, and is preferably of laminar construction. The base plate is elongated, as clearly shown in FIGURE 2, and it consists of a core lamination 25 and face laminations 26 and 27 removably secured to the opposite face of the core in any suitable manner, such as by screws 28 which extend freely through face lamination 26 and core lamination 25, and are threaded into face lamination 27, see FIGURE 7. If desired, longer screws 30 may be used in the same manner with the exception that they extend freely through face lamination 27 and are threaded into support section 16 to secure base plate 22 to said section. Plate 22 is formed with a supporting edge 33 at the top thereof, said edge preferably extending substantially horizontally, and core lamination 25 is spaced inwardly from said supporting edge to form a groove 35 in the edge between face laminations 26 and 27 and extending longitudinally of said edge and in which lugs 37 of a saw chain 38 extending along the supporting edge may move with cutting teeth 39 and depth gauges 40 of said chain projecting away from the edge in the plane of plate 22.

A pair of relatively movable jaw plates 45 and 46 are substantially parallel with the opposite faces of base plate 22 and are located to one side of support 12. These jaw plates have jaws 48 and 49 on their upper edges extending towards each other over the supporting edge 33 of the base plate, see FIGURES 3 and 4. These pairs are spaced apart to form a gap 50 therebetween through which chain 38 extends. Means is provided for connecting the jaw plates together, and this is preferably accomplished by bending the lower ends of the jaw plate inwardly beneath base plate 22 and connecting them together at 51 by any suitable means, such as bolts 52, as clearly shown in FIGURES 2 and 3. These jaw plates are connected to the base plate for movement up and down relative thereto, and suitable means is provided for moving at least one of the jaws 48 and 49 towards and away from the other to decrease and increase the size of gap 50. This is accomplished by means of a lower bolt 54 which extends through base plate 22 and through a vertical slot in at least one of the jaw plates 45 and 46. In this example, bolt 54 extends through a vertical slot 55 formed in jaw plate 46, and has a wing nut 57 and lock nut 58 threaded on the outer end thereof, see FIGURES 3 and 6. An upper bolt 59 also extends through base plate 22 and is fixedly secured thereto by nuts 60 and 61, see FIGURES 3 and 4. One end of bolt 59 extends through a vertical slot 62 in jaw plate 46 near the upper end thereof, and has a nut 63 on its outer end. One or more set screws 64, there are two in this example, are threaded through plate 46 and bear at their inner ends against base plate 22. These set screws are used to position jaw 49 over the upper edge of the base plate, and nut 63 is tightened to retain it in any adjusted position. The opposite end of bolt 59 extends through a vertical slot 65 in jaw plate 45 and has a wing nut 66 threaded on its outer end. This nut may be turned to adjust jaw 48 towards and away from jaw 49 to decrease or increase the size of gap 50 therebetween. When nuts 57, 58, 63 and 66 are turned outwardly on their respective bolts and set screws 64 are released, jaw plates 45 and 46 and, consequently, jaws 48 and 49 may be shifted upwardly and downwardly relative to base plate 22.

Base plate 22 is preferably curved downwardly at 67 and 68 at the ends of supporting edge 33. In addition to this, the portion 69 of the horizontal supporting edge 33 adjacent support 12 is inclined downwardly towards the curved end 68 of the base plate.

When it is desired to sharpen and/or joint a saw chain 38, a portion of the latter is placed over the supporting edge 33 of base plate 22 with its lugs 37 fitting into groove 35 along said supporting edge. Jaws 48 and 49 are open, that is, jaw 48 is moved outwardly from jaw 49, at this time so that the chain extends between said jaws. Jaw plates 45 and 46 are adjusted vertically relative to base plate 22 so as to position the edges of jaws 48 and 49 just above the rivets 72 of chain 38. Nuts 57 and 58 are tightened to fix the jaw plates relative to base plate 22. Then set screws 64 are turned to move jaw 49 to a position where the portion of the chain bearing against said jaw is upright on the base plate. Nut 63 is tightened to retain the jaw in this set position. Nut 66 is tightened to move the jaw 48 towards jaw 49 until said jaws press lightly against the portion of the chain immediately above its rivets 72. These jaws provide lateral support for cutter teeth 39 and depth gauges 40, and yet they are not tightened sufficiently to prevent the chain from being moved along the supporting edge 33.

As there are different sizes of saw chains, and as it is desirable to have the lugs 37 of the chain fit in groove 35 with as little play as possible, base plate 22 is made with a core lamination 25 that may be easily changed in order to adjust the width and depth of groove 35.

A base 80 is supported above supporting edge 33 of base plate 22 by means of an arm 81 which is connected to a side of the base and extends downwardly therefrom to overlap said base plate. Arm 81 is connected to the base plate in any desired manner. In this example, the arm overlaps the upper section 16 of support 12 and is connected thereto by a screw 83 that extends through a vertical slot 84 in the arm and is threaded into said section 16. As this section is connected to the base plate, arm 81 is in effect connected thereto also. In order to prevent arm 81 from swinging laterally while permitting it to be moved vertically, upper section 16 is formed with a vertical groove 86 into which said arm extends. This groove is just wide enough to accommodate the arm, see FIGURES 5 and 6.

A horizontal support 90 is spaced upwardly from base 80 and has side flanges 91 extending downwardly therefrom overlapping the sides of the base. The flanges of this support are pivotally connected to the base by a pin 93 extending therethrough and through the base. A horizontal lug 95 projects outwardly from an end of base 80, as clearly shown in FIGURES 1, 2 and 6, and a spring 96 compressed between said lug and a projection 97 extending outwardly from the end of support 90 outside pin 93, swings the opposite end of said support toward base 80. The angular position of support 90 relative to base 80 may be adjusted by means of a set screw 98 which is threaded through said support and bears against the base. A spring 99 on the screw between the head thereof and the upper surface of support 90 maintains a tension on the screw so that it will not turn on its own as a result of vibration or other causes. The upper surface of the head of the set screw has graduations 101 around the edge thereof, said graduations representing thousandths of an inch. An indicator 102 is mounted on and projects upwardly from support 90 adjacent the head of the set screw so that graduations 101 may be read relative to this indicator.

A vertical support 105 projects upwardly from horizontal support 90 at the end thereof remote from pin 93. The vertical support has a curved upper edge 106 which is provided with graduations 107 thereon representing degrees of a circle.

An angular bracket 110 consists of a circular vertical section 112 and a substantially circular horizontal section 114 extending outwardly from the upper part of said vertical section. The vertical section 112 of the bracket is rotatably mounted on vertical support 105 by means of a threaded pin 116 which is secured to said vertical section centrally thereof and freely extends through the centre of support 105. A wing nut 117 is threaded on the pin or screw 116 and may be tightened to hold bracket 110 firmly against the vertical support. The upper edge 119 of section 112 coincides with the curved upper edge 106 of support 105, and edge 119 has an indicator mark 120 thereon against which graduations 107 may be read.

A disc 123 is rotatably mounted on the horizontal section 114 of bracket 110 by means of a bolt 124 which is secured to the disc centrally thereof and extends freely through the centre of said horizontal section. A wing nut 125 is threaded on to the lower end of the bolt, and may be tightened fixedly to secure the disc relative to the horizontal support. Two sets of graduations 127 and 128 appear on the upper surface of disc 123. These sets are spaced from each other, and represent degrees of a circle. These graduations may be read against indicator mark 120.

Guide means is provided on the upper surface of disc 123. In this example, the guide means is in the form of a pair of aligned and spaced apart lugs 132 and 133 that project upwardly from said disc, and a rod 135 of a file frame 136 slidably extends through aligned holes in lugs 132 and 133. Rod 135 is circular in cross section in order that frame 136 may be swung back and forth relative to the rest of the apparatus as well as being reciprocated in a direction extending longitudinally of said rod. The file frame includes holders 138 and 139 at the ends of rod 135. Holder 138 is provided with a socket 142 adjacent its upper end and with another socket 143 spaced downwardly from the first socket, said sockets being interconnected by a slot 144 which extends completely through the holder. An end of rod 135 extends into socket 142, while an end of another rod 146 fits into socket 143. A screw 147 is threaded through the portion of holder 138 between sockets 142 and 143 so that it may be turned to clamp rods 135 and 146 in their respective sockets. Similarly, holder 139 is provided with an upper socket 150, a lower socket 151, slot 152 and screw 153. The opposite ends of rods 135 and 146 fit into sockets 150 and 151, and are clamped therein by means of screw 153. Rod 146 is preferably square in cross section, although it does not have to be. When holders 138 and 139 hang downwardly, rod 146 bears against a stop 156 which projects outwardly from the centre of vertical section 112 of bracket 110.

The lower end of holder 138 is formed with an enlargement 159 having a relatively large, substantially triangularly-shaped socket 160 therein. A set screw 161 extends upwardly through enlargement 159 into socket 160. Holder 139 also is formed with an enlargement 165 at its lower end and having a substantially triangularly-shaped socket 166 therein into which a set screw 167 projects. Sockets 160 and 166 are aligned and adapted to receive files of different cross sectional shape. A cylindrical file 170 is shown in these sockets, said file being held therein by said screws 161 and 167. Triangular, diamond-shaped and flat files may be gripped in these sockets.

The file carried by frame 136 is to be used to sharpen the cutter teeth and to regulate the height of the depth gauges of a saw chain carried by base plate 22. Cylindrical file 170 is used to sharpen the cutting edges of cutter teeth 39 illustrated in the drawings. The file extends across the plane of base plate 22 and chain 38 thereon. The file is set at a desired angle by turning disc 123 to bring the required graduation 127 into line with mark 120. Then the disc is tightened in position by means of nut 125. If it is necessary to tip frame 136 and the file transversely of the chain, bracket 110 is rotated laterally relative to vertical support 105 to the desired position, and then nut 117 is tightened. Fine adjustment of the file vertically relative to the chain is accomplished by turning set screw 98 to raise or lower support 90 relative to base 80.

Means has been provided for locating each cutter tooth or depth gauge to be filed in proper position relative to the file carried by frame 136. In this example, this is accomplished by means of a finger 175 carried by base 80 and inclined downwardly therefrom towards the supporting edge 33 of base plate 22. This finger is actually hingedly connected at 176 at its upper end to a horizontal bar 177 which extends longitudinally of base 80 against its undersurface, and along and beyond lug 95. This bar has a slot 179 therein extending longitudinally thereof, and a bolt 180 extends upwardly through this slot and through a hole in lug 95, and has a wing nut 181 threaded on its upper end. A spring 182 on the bolt beneath the nut keeps the latter from turning due to vibration or the like. When nut 181 is loosened, bar 177 may be adjusted longitudinally of base 80, thereby shifting finger 175 longitudinally of said base. A guide pin 184 projects downwardly from base 80 into slot 179 of bar 177 to prevent said bar from swinging laterally relative to the base. As very fine adjustments are required, means is provided for making fine adjustments of bar 177 longitudinally of the base. A relatively long screw 186 extends longitudinally of slot 179 and is threaded through bolt 180. This screw has a head 187 at its outer end located in an enlargement 188 of slot 179 formed in an enlargement 189 of said bar. When head 187 is turned in one direction to move screw 186 inwardly, said head abuts against a shoulder 190 in enlargement 189 to move bar 177 in the same direction. When head 187 is turned in the opposite direction to move the screw outwardly, said head abuts against another shoulder 191 in the bar enlargement to move said bar outwardly. Thus, when nut 181 is loosened, screw 186 may be turned to make a fine adjustment of the position of finger 175. Then nut 181 is turned to clamp bar 177 in the adjusted position so that finger 175 is retained in its proper position.

The holding apparatus is adjusted for the chain 38 which is to be sharpened. In order to get the chain into position, frame 136 is swung upwardly out of the way. Then the chain is placed over the supporting edge 33 of base plate 22 beneath finger 175 and within jaws 48 and 49. The inclined portion 69 of the base plate is located beneath base 80 so that there is sufficient room for the cutting teeth 39 to move beneath said base. Nut 66 is turned to tighten jaws 48—49 sufficiently to enable them to support the cutter teeth against substantial lateral movement while permitting the chain to move between said jaws. The chain is moved along the supporting edge of base plate 22 until the cutter tooth to be sharpened abuts against the outer or free end of finger 175. Then frame 136 is swung downwardly until file 170 is bearing against the forward or cutting edge of the tooth. The frame is then reciprocated to move the file across the tooth cutting edge to sharpen said edge. All the cutting teeth on one side of the chain are sharpened, and then disc 123 is swung around to reverse the angle of the frame and the file so that all the cutter teeth on the other side of the chain may be filed.

If it is desired to joint the chain, a flat file is placed in sockets 160 and 166 of frame 136 and held in position by the set screws at these sockets. Support 90 is adjusted up and down to set the file in the desired plane relative to the chain. The depth gauges 40 are successively moved into position against the end of finger 175. The file frame is reciprocated to cause the file to work against the outer edge of each depth gauge. This is repeated for each depth gauge of the chain so that they all project outwardly the same distance from the chain.

FIGURES 8 to 10 illustrate a saw chain holding and filing apparatus 10a which has a different file frame 205 from the frame 136 shown in apparatus 10, but is the same as the latter in all other respects.

File frame 205 includes a rod 208 slidably extending through the aligned holes of lugs 132 and 133. This rod is circular in cross section in order to enable frame 205 to be swung back and forth relative to the rest of the apparatus as well as to be reciprocated longitudinally of said rod. Frame 205 also includes a holder 211 which is the same as holder 139 described above. Holder 211 is formed with a socket 212 near its upper end into which rod 208 fits, and another socket 213 spaced below the first socket, said sockets being interconnected by a slot, not shown, similar to slot 152 of holder 139. A screw 215 is threaded through the portion of holder 211 between sockets 212 and 213 so that it may be turned to clamp rod 208 in socket 212. If desired, the lower end of holder 211 may be formed with an enlargement 217 similar to enlargement 165 of holder 139. Enlargement 217 is provided only if it may be desired to convert apparatus 10a into a hand-operated device, otherwise the enlargement may be omitted.

Suitable holding means for an electric motor 220 is provided at the opposite end of rod 208. In this example, the holding means comprises holders 222 and 223 which are similar to holder 211 with the lower part and enlargement 217 of the latter omitted. Rod 208 extends through sockets 225 and 226 of holders 222 and 223 and is clamped therein by means of set screws 228 and 229. Holders 222 and 223 have sockets 232 and 233 therein spaced below their respective sockets 225 and 226 and through which another rod 235 extends, said rod also extending through socket 213 of holder 211. Rod 235 is clamped in the sockets of the holders by screws 215, 228 and 229. This rod 235 bears against stop 156 when holder 211, 222 and 223 hang downwardly. Motor 220 is secured to the lower ends of holders 222 and 223 in any desired manner. In this example, holders 222 and 223 are provided with laterally-extending lugs 236 and 237, and bolts 238 and 239 extend through holes in these lugs and into the motor housing. If desired, the hole of lug 236 may be in the form of a transverse arcuate slot 240, see FIGURE 9, so that motor 220 may be adjusted laterally relative to the remainder of frame 205. With this arrangement, motor 220 hangs beneath holders 222 and 223, and forms part of frame 205.

If it is desired to operate apparatus 10a manually, holders 222 and 223 may be removed and another holder similar to holder 211 may be substituted therefor so that a file may be carried by said holders in the same manner as illustrated in apparatus 10.

Motor 220 has suitable gripping means, such as a chuck 242, connected to its shaft 243, said chuck being adapted to hold a comparatively short cylindrical file 245 that has a prong 246 projecting from an end thereof to fit into the chuck. Motor 220 is so positioned that when frame 205 hangs downwardly, file 245 is in proper position to file the cutting teeth 39 of saw chain 38. A sleeve 249 is mounted on rod 208 between holder 223 and stop 131, see FIGURE 8. This sleeve is of such length as to prevent frame 205 being moved far enough to permit chuck 242 to strike the saw chain during reciprocation of said frame. In other words, sleeve 249 acts as a stop to prevent the motor chuck from hitting the chain.

The holding and filing apparatus 10a functions in the same manner as apparatus 10, with the exception that file 245 is axially rotated while frame 205 is reciprocated to move the file across the tooth being sharpened. The file is rotated by motor 220 so that the power for the filing action is provided by the motor rather than by the reciprocating action of frame 205. It is usual to reciprocate the frame solely during the filing operation, but this is not absolutely necessary. Otherwise, the positioning of the saw chain and the operation of the filing apparatus is the same as described above in connection with apparatus 10. If it is desired to joint a chain, a flat file may be substituted for file 245, in which case motor 220 cannot be operated, but frame 205 is reciprocated to create the filing action. Alternatively, holders 222 and 223 along with the motor may be removed, and a holder similar to holder 211 substituted thereof. In this case, a flat file may be carried by the file frame holders to accomplish the jointing operation.

What I claim as my invention is:

1. Saw chain holding and filing apparatus comprising an elongated vertical base plate having a substantially horizontal supporting edge, a groove in and extending longitudinally of the supporting edge in which lugs of a saw chain extending along said edge may move with cutting teeth and depth gauges of said chain projecting away from the edge in the plane of the plate, a mounting support connected to the base plate for carrying the apparatus when in use, a pair of jaws carried by the base plate and extending towards each other over the supporting edge, said jaws being relatively movable to increase and decrease the size of a gap therebetween, means connected to at least one of the jaws for moving said jaw towards and away from the other jaw to grip and release a chain on the supporting edge and extending through the jaw gap, a base over and spaced from the supporting edge, supporting means secured to the base plate and the base for holding the latter in place over the supporting edge, said base being spaced from the supporting edge sufficiently to permit a chain on said edge to move therebetween, a substantially horizontal support pivotally mounted on the base for movement towards and away from said base, means for adjusting the support towards and away from the base, a horizontal portion mounted on the horizontal support, a disc mounted on and parallel with said horizontal portion, pivot means connecting the disc to the horizontal portion to permit the former to rotate on the latter, securing means for retaining the disc in adjusted positions on the horizontal portion, guide means fixedly mounted on the disc and normally extending generally at an angle to and across the plane of the base plate, a frame having a rod slidably and swingably extending through the guide means, said frame extending towards the base plate, and clamping means on the frame spaced from the rod adapted to grip a file to hold it in a position substantially parallel with the rod and extending across the base plate plane and a saw chain on the supporting edge thereof.

2. Saw chain holding and filing apparatus comprising a base plate having a supporting edge, a groove in and extending longitudinally of the supporting edge in which lugs of a saw chain extending along said edge may move with cutting teeth and depth gauges of said chain projecting away from the edge in the plane of the plate, a mounting support connected to the base plate for carrying the apparatus when in use, a pair of jaws carried by the base plate and extending towards each other over the supporting edge, said jaws being relatively movable to increase and decrease the size of a gap therebetween, means connected to at least one of the jaws for moving said jaw towards and away from the other jaw to grip and release a chain on the supporting edge and extending through the jaw gap, a base over and spaced from the supporting edge, supporting means secured to the base plate and the base for holding the latter in place over the supporting edge, said base being spaced from the supporting edge sufficiently to permit a chain on said edge to move therebetween, a finger carried by the base and inclined towards the supporting edge of the base plate, said finger acting as a stop for cutter teeth and depth gauges of a saw chain on the supporting edge, said finger being swingable away from the supporting edge to permit cutter teeth and gauges to move therebeneath, a frame swingably mounted on the base extending towards the base plate and across the plane of the latter, and clamping means on the frame adapted to grip a file to hold it across the base plate plane near the stop finger and a saw chain on the supporting edge.

3. Saw chain holding and filing apparatus comprising an elongated vertical base plate having a substantially horizontal supporting edge, a groove in and extending longitudinally of the supporting edge in which lugs of a saw chain extending along said edge may move with cutting teeth and depth gauges of said chain projecting away from the edge in the plane of the plate, a mounting support connected to the base plate for carrying the apparatus when in use, a pair of jaws carried by the base plate and extending towards each other over the supporting edge, said jaws being relatively movable to increase and decrease the size of a gap therebetween, means connected to at least one of the jaws for moving said jaw towards and away from the other jaw to grip and release a chain on the supporting edge and extending through the jaw gap, a base over and spaced from the supporting edge, supporting means secured to the base plate and the base for holding the latter in place over the supporting edge, said base being spaced from the supporting edge sufficiently to permit a chain on said edge to move therebetween, a substantially horizontal support pivotally mounted on the base for movement towards and away from said base, means for adjusting the support towards and away from the base, a horizontal portion mounted on the horizontal support, a disc mounted on and parallel with said horizontal portion, pivot means connecting the disc to the horizontal portion to permit the former to rotate on the latter, securing means for retaining the disc in adjusted positions on the horizontal portion, guide means fixedly mounted on the disc and normally extending generally at an angle to and across the plane of the base plate, a frame having a rod slidably and swingably extending through the guide means, said frame extending towards the base, a motor carried by the frame near one end thereof and spaced from the rod, and clamping means rotated by the motor and adapted to grip a cylindrical file and to hold it in a position substantially parallel with the rod and extending across the base plate plane and a saw chain on the supporting edge thereof.

4. Saw chain holding and filing apparatus comprising a base plate having a supporting edge, a groove in and extending longitudinally of the supporting edge in which lugs of a saw chain extending along said edge may move with cutting teeth and depth gauges of said chain projecting away from the edge in the plane of the plate, a mounting support connected to the base plate for carrying the apparatus when in use, a pair of jaws carried by the base plate and extending towards each other over the supporting edge, said jaws being relatively movable to increase and decrease the size of a gap therebetween, means connected to at least one of the jaws for moving said jaw towards and away from the other jaw to grip and release a chain on the supporting edge and extending through the jaw gap, a base over and spaced from the supporting edge, supporting means secured to the base plate and the base for holding the latter in place over the supporting edge, said base being spaced from the supporting edge sufficiently to permit a chain on said edge to move therebetween, a finger carried by the base and inclined towards the supporting edge of the base plate, said finger acting as a stop for cutter teeth and depth gauges of a saw chain on the supporting edge, said finger being swingable away from the supporting edge to permit cutter teeth and gauges to move therebeneath, a frame swingably and slidably mounted on the base extending towards the base plate and across the plane of the latter, a motor carried by and forming part of said frame, and clamping means rotated by the motor and adapted to grip a cylindrical file and to hold it across the base plate plane near the stop finger and a saw chain on the supporting edge.

5. Saw chain holding and filing apparatus comprising a base plate having a supporting edge, a groove in and extending longitudinally of the supporting edge in which lugs of a saw chain extending along said edge may move with cutting teeth and depth gauges of said chain projecting away from the edge in the plane of the plate, a mounting support connected to the base plate for carrying the apparatus when in use, a pair of jaws carried by the base plate and extending towards each other over the supporting edge, said jaws being relatively movable to increase and decrease the size of a gap therebetween, means connected to at least one of the jaws for moving said jaw towards and away from the other jaw to grip and release a chain on the supporting edge and extending through the jaw gap, a base over and spaced from the supporting edge, supporting means secured to the base plate and the base for holding the latter in place over the supporting edge, said base being spaced from the supporting edge sufficiently to permit a chain on said edge to move therebetween, a substantially horizontal support pivotally mounted on the base for movement towards and away from said base, means for adjusting the support towards and away from the base, a frame swingably and slidably mounted on the base extending towards the base plate and across the plane of the latter, a motor carried by and forming part of said frame, and clamping means rotated by the motor and adapted to grip a cylindrical file and to hold it across the base plate plane and a saw chain on the supporting edge thereof.

6. Saw chain holding and filing apparatus comprising a base plate having a supporting edge, a groove in and extending longitudinally of the supporting edge in which lugs of a saw chain extending along said edge may move with cutting teeth and depth gauges of said chain projecting away from the edge in the plane of the plate, a mounting support connected to the base plate for carrying the apparatus when in use, a pair of jaws carried by the base plate and extending towards each other over the supporting edge, said jaws being relatively movable to increase and decrease the size of a gap therebetween, means connected to at least one of the jaws for moving said jaw towards and away from the other jaw to grip and release a chain on the supporting edge and extending through the jaw gap, a base over and spaced from the supporting edge, supporting means secured to the base plate and the base for holding the latter in place over the supporting edge, said base being spaced from the supporting edge sufficiently to permit a chain on said edge to move therebetween, a substantially horizontal support pivotally mounted on the base for movement towards and away from said base, means for adjusting the support towards and away from the base, a motor carried by the frame near one end thereof and spaced from the rod, and clamping means rotated by the motor and adapted to grip a cylindrical file and to hold it in a position substantially parallel with the rod and extending across the base plate plane and a saw chain on the supporting edge thereof.

References Cited in the file of this patent

UNITED STATES PATENTS

| | | |
|---|---|---|
| 2,818,752 | Granberg | Jan. 7, 1958 |
| 2,833,165 | Irwin | May 6, 1958 |
| 2,833,166 | Wilson | May 6, 1958 |
| 2,932,993 | Weatherly | Apr. 19, 1960 |
| 2,932,994 | Weatherly | Apr. 19, 1960 |
| 2,962,061 | Nielsen | Nov. 29, 1960 |